(12) United States Patent
Wilkinson et al.

(10) Patent No.: US 7,571,272 B2
(45) Date of Patent: Aug. 4, 2009

(54) INFINIBAND/FIBRE CHANNEL BRIDGE ARCHITECTURE

(75) Inventors: Keith Iain Wilkinson, Fremont, CA (US); Tracy Edmonds, Morgan Hill, CA (US); Shrikant Jay Vaidya, Rancho Santa Margarita, CA (US); Jonathan Rollo Pearce, Sherwood, OR (US)

(73) Assignee: Cisco Technology, Inc., San Jose, CA (US)

( * ) Notice: Subject to any disclaimer, the term of this patent is extended or adjusted under 35 U.S.C. 154(b) by 129 days.

(21) Appl. No.: 11/469,369

(22) Filed: Aug. 31, 2006

(65) Prior Publication Data

US 2007/0143523 A1 Jun. 21, 2007

Related U.S. Application Data

(60) Provisional application No. 60/752,692, filed on Dec. 21, 2005.

(51) Int. Cl.
*G06F 13/00* (2006.01)
(52) U.S. Cl. ........................................ 710/315; 370/402
(58) Field of Classification Search ......... 710/300–317; 370/402
See application file for complete search history.

(56) References Cited

U.S. PATENT DOCUMENTS 7,072,970 B2 * 7/2006 Georgiou et al. ............. 709/230
2004/0024905 A1 * 2/2004 Liao et al. .................... 709/239
2005/0165786 A1 * 7/2005 Ahmed et al. ................. 707/10
2007/0143522 A1 * 6/2007 Wilkinson et al. ............ 710/310

OTHER PUBLICATIONS

"Unified Fabric: Benefits and Architecture of Virtual I/O" White Paper; Cisco Systems, Inc., 2005.*
"Voltaire Fibre Channel Router Module" brochure; Voltaire Inc., 2005.*
"InfiniBand Storage in Limbo"; Storage Magazine; Feb. 2004; accessed on Apr. 8, 2008 via URL <http://searchStorage.techtarget.com/magazineFeature/0,296894,sid5_gci1258610,00.html>.*

* cited by examiner

*Primary Examiner*—Glenn A Auve
(74) *Attorney, Agent, or Firm*—Schwegman, Lundberg & Woessner, P.A.

(57) ABSTRACT

A bridge comprises an InfiniBand channel adapter, a fiber channel adapter, a command path, and a data path. The command path is coupled to the InfiniBand channel adapter and the fiber channel adapter; and the command path is operable to receive commands from a first of the InfiniBand and fiber channel adapters, to process the received commands, and to transmit the processed command to the other of the Infini-Band and fiber channel adapters. The data path is coupled to the InfiniBand adapter and fiber channel adapter, and is operable to transfer data from the first of the InfiniBand and fiber channel adapters to the other of InfiniBand and fiber channel adapters.

27 Claims, 1 Drawing Sheet

INFINIBAND/FIBRE CHANNEL BRIDGE ARCHITECTURE

RELATED APPLICATIONS

This patent application claims the benefit of priority, under 35 U.S.C. Section 119(e), to U.S. Provisional Patent Application Ser. No. 60/752,692, filed on Dec. 21, 2005, the entire content of which is incorporated herein by reference.

FIELD

The invention relates generally to computer data interfaces, and more specifically to an architecture for an InfiniBand-to-Fibre Channel interface.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computer systems typically include a number of common components, including processors, memory, and hard disk storage. A computer bus couples the various components, often using specific interfaces between the bus and the various computer devices attached to the device. For example, memory and video adapters are often on their own special high-speed buses designed for the particular demands of the attached devices, and hard disk drives are often attached via a storage adapter such as a SATA (serial ATA) or SCSI (small computer system interface) interface coupled between the main computer bus and the storage devices. The interface adapter is designed to communicate with and control a specific type of attached device, such as a SATA hard disk drive or CD-ROM drive, or a SCSI hard disk drive or SCSI tape drive.

In more sophisticated computer systems, hard disk storage interfaces such as SATA are replaced with multiple channels of SCSI adapters, or more sophisticated interfaces such as Fibre Channel or InfiniBand. These interfaces are both high-speed interfaces designed to enable attachment of a number of high-speed peripheral devices such as hard disk drives to a single interface channel, and to enable sophisticated configurations of storage devices such as redundant arrays of independent disk drives (RAID) and storage area networks. Some interface technologies also enable connection of devices other than storage devices, including InfiniBand's support for network interfaces and processor clusters external to a particular server.

But, with a variety of formats available, connection between peripheral devices supporting different standards can be an important factor in achieving the desired configuration or performance of a system. One common solution to such problems is to simply configure a computer system having both types of adapter, so that it can access both types of devices. This involves expense of adding hardware and increases the complexity of the system, and may consume resources such as computer bus slots or processor time that are in high demand. Another solution is to build a special-purpose computer system having interfaces for both systems, designed to act only as a "bridge" between the two interfaces. Such systems typically receive information in one interface format in an interface adapter and decode the data, at which point it can be transferred in the bridge to an interface adapter supporting another interface format for encoding and transmission.

But, such bridge systems are often significantly slower at translating and passing on data than the native speed of either of the interface formats involved, and so are typically a bottleneck in such a bridge system. The performance of a bridge system is therefore a concern to those incorporating a bridge into a computer system.

DETAILED DESCRIPTION

Figure 1:
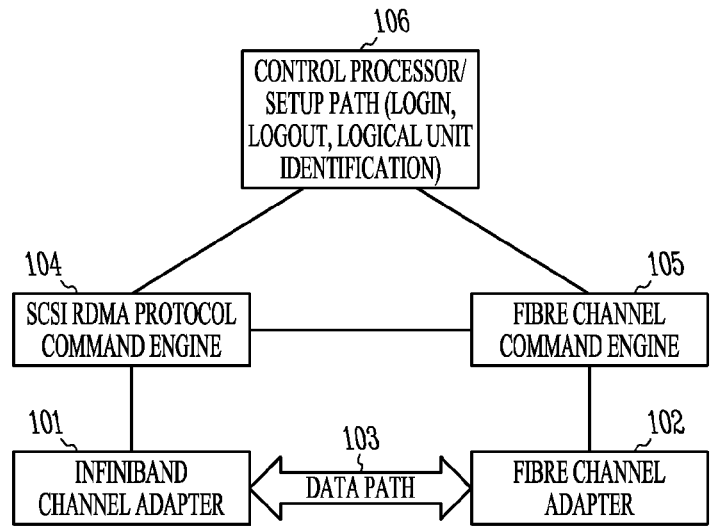
FIG. 1 is a block diagram showing the various tiers or paths in one example of an InfiniBand-fibre channel bridge, consistent with an example embodiment of the invention.

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

In one example embodiment, the invention provides a bridge between InfiniBand and fibre channel format electronic or optical network technologies. The bridge comprises InfiniBand and fibre channel interfaces, as well as a fast path for data transfer and a slow path for command parsing and transfer between the two protocols. In a further embodiment, a third tier of path processing is provided for setup and configuration functions such as to manage logon. The bridge is operable in some embodiments to transport upper-layer protocols such as SCSI via the fibre channel and InfiniBand connections, and to provide both command and data bridging using the slow and fast paths.

Fibre channel is a network technology used primarily for storage networking, and is a recognized ANSI standard network protocol and technology. It includes point-to-point, arbitrated loop, and switched fabric network structures, and is typically carried over either optical fiber or twisted pair copper wire. Fibre channel is a serial communications format, meaning that data is transmitted sequentially rather than in parallel over several physical connections at the same time. Fibre channel includes a physical layer description, defining the physical connections and signaling or coding format used to exchange data, as well as layers supporting advanced function configuration and applications or protocols such as SCSI (small computer system interface), IP (Internet Protocol), the IEEE 802.2 networking protocol, and interprocessor signals in a multiprocessor network.

InfiniBand is also a serial computer communications technology, using high-speed copper wire or optical connection between communicating elements in a computer system or network to exchange data. InfiniBand is commonly used for interprocessor communications in a multiprocessor computing system, and for connection to peripheral devices such as network adapters and storage devices. InfiniBand is promoted as a replacement for the typical shared bus in a computer system due to its switched nature, allowing multiple devices to use the switched network at the same time. InfiniBand includes among its functions a type of remote memory access known as RDMA, or remote direct memory access, enabling one InfiniBand device to directly read or write memory of another InfiniBand device. This feature has become a part of other standards used with Infiniband, such as SCSI RDMA protocol, in which SCSI commands and data transfers are communicated via InfiniBand RDMA exchanges. InfiniBand shall, for purposes of this application, include any channel-based, switched fabric, interconnect architecture known or referred to in the industry as "InfiniBand" at the time of filing of this application, including any such architecture interoperable or compatible with an Infiniband standard such as those published by the InfiniBand trade association (www.infinibandta.com) at the time of filing of this application.

Various embodiments of the invention seek to provide for use of a combination of InfiniBand devices and fibre channel devices on the same network, by bridging InfiniBand and fibre channel networks. The bridge includes hardware interfaces for InfiniBand and fibre channel networks, and has a fast path for data transfer and a slow path for command parsing and transfer between the two protocols. In a further embodiment, a third tier of path processing is provided for setup and configuration functions such as to manage login and logout. The bridge is operable in some embodiments to transport upper-layer protocols such as SCSI via the fibre channel and InfiniBand connections, and to provide both command and data bridging using the slow and fast paths.

FIG. 1 is a block diagram showing the various tiers or paths in one example of an InfiniBand-fibre channel bridge. An InfiniBand channel adapter 101 and a fibre channel adapter 102 are linked by a data path 103, as well as by a command engine path comprising SCSI RDMA protocol engine 104 and fibre channel command engine 105. A control processor 106 is coupled to the command engine path, and is in a further embodiment linked to a memory.

In one example of operation, the control processor is able to establish a connection between an InfiniBand device or network and a fibre channel device or network, handling tasks such as logon and logoff. A SCSI RDMA protocol command is received over the InfiniBand connection in the channel adapter 101, and is forwarded to the SCSI RDMA protocol engine 104 for parsing. The SCSI RDMA protocol engine forwards a fibre channel SCSI command pointer to the fibre channel adapter 102, and the raw SCSI command is forwarded to the fibre channel command engine 105. The SCSI command is sent to the fibre channel adapter, and is transmitted as a fibre channel protocol command from the fibre channel adapter.

A command response is received in the fibre channel adapter, and the response is forwarded from the fibre channel adapter 102 back to the fibre channel command engine 105. The fibre channel command engine notifies the fibre channel adapter 102 that the exchange is complete, and forwards the raw, parsed SCSI response to the SCSI RDMA protocol command engine 104. The SCSI RDMA command engine sends the SCSI RDMA formatted response to the InfiniBand channel adapter 101, where the response is forwarded via the InfiniBand connection to the command issuer.

Commands received in the fibre channel adapter are similarly handled through the command channel of the InfiniBand adapter, which includes SCSI RDMA engine 104 and fibre channel command engine 105. Once a connection is established, commands and data can be sent through the bridge, but data messages do not take the slow path through the command engines 104 and 105, but are communicated via a data path 103 between the InfiniBand adapter 101 and the fibre channel adapter 102. The data channel 103 is in this example called the fast path, because it provides for faster message forwarding than the command path, also known as then slow path. Some further embodiments of the invention can send data across the bridge in both directions between linked fibre channel and Infiniband-connected devices, and are therefore considered bidirectional bridge devices.

Figure 2:
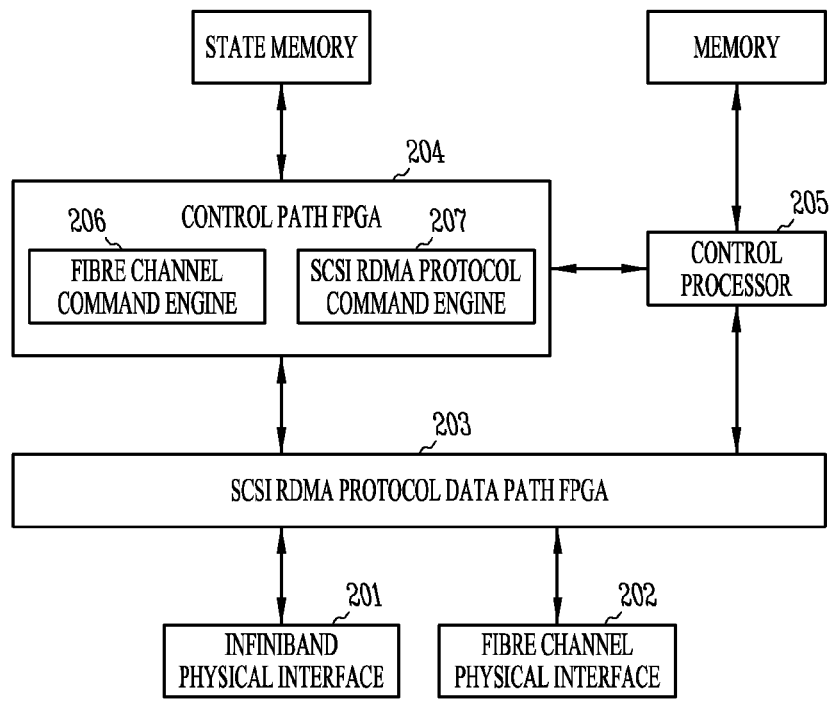
FIG. 2 shows a more detailed architecture of a bridge, consistent with an example embodiment of the invention.

A more detailed example of the architecture of one example implementation of a bridge is shown in FIG. 2. An InfiniBand physical interface 201 and a fibre channel physical interface 202 are coupled to a SCSI RDMA protocol data path FPGA 203, which is operable to transfer or transmit data messages between the InfiniBand interface 201 and the fibre channel interface 202 without processing or translation in the control path FPGA 204 or the control processor 205.

The control path FPGA 204 comprises a fibre channel command engine 206 and a SCSI RDMA protocol command engine 207, which are used in the control path or slow path to process commands received in either the InfiniBand interface 201 or the fibre channel interface 202, as shown in greater detail in FIG. 1. The control processor 205 is used to manage configuration of the bridge connection, such as to manage logon and logoff or to handle exception conditions, and is a third tier of processing. This three-tier architecture shown in FIG. 2 enables rapid processing of commands that do not require intervention from the control processor 205, and even faster handling of data through the SCSI RDMA protocol data path 203 that do not contain commands.

The three tiers of this architecture therefore provide three paths for handling various types of messages, providing for relatively fast handling of data and higher throughput and performance than various prior art bridge architectures. Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A bridge, comprising:
    an InfiniBand channel adapter;
    a fibre channel adapter;
    a command path coupled to the InfiniBand channel adapter and the fibre channel adapter; the command path operable to receive commands from a first of the InfiniBand and fibre channel adapters, to process the received commands, and to transmit the processed command to the other of the InfiniBand and fibre channel adapters; and
    a data path coupled to the InfiniBand adapter and fibre channel adapter; the data path operable to transfer data from the first of the InfiniBand and fibre channel adapters to the other of InfiniBand and fibre channel adapters, wherein the data path comprises a separate path bypassing the command path such that the data path is operable to transfer data between the InfiniBand channel adapter and the fibre channel adapter faster than the command path.

2. The bridge of claim 1, the command path further operable to configure a connection for data path transfer of data between the InfiniBand adapter and the fibre channel adapter.

3. The bridge of claim 1, wherein processing received commands in the command path comprises protocol translation.

4. The bridge of claim 1, further comprising a setup path coupled to the InfiniBand channel adapter and the fibre channel adapter; the setup path operable to handle configuration of a link between the fibre channel adapter and the Infiniband channel adapter.

5. The bridge of claim 4, wherein configuration of the link comprises login.

6. The bridge of claim 4, wherein configuration of the link comprises logout.

7. The bridge of claim 4, wherein configuration of the link comprises logical unit identification.

8. The bridge of claim 1, wherein the bridge is bidirectional, and:
the command path is further operable to receive commands from the other of the InfiniBand and fibre channel adapters, to process the received commands, and to transmit the processed command to the first of the InfiniBand and fibre channel adapters; and
the data path further operable to transfer data from the other of InfiniBand and fibre channel adapters to the first of the InfiniBand and fibre channel adapters.

9. The bridge of claim 1, further operable to translate SCSI commands carried over a first of InfiniBand and fibre channel to the other of InfiniBand and fibre channel.

10. A method of bridging InfiniBand and Fibre channel, comprising:
processing in a command path commands received from a first of InfiniBand and fibre channel adapters;
transmitting the processed command to the other of the InfiniBand and fibre channel adapters; and
transferring data in a data path from the first of the InfiniBand fibre channel adapters to the other of InfiniBand and fibre channel adapters wherein the data path comprises a separate path bypassing the command path such that the data path is operable to transfer data between the InfiniBand channel adapter and the fibre channel adapter faster than the command path.

11. The method of claim 10, the command path further operable to configure a connection for data path transfer of data between the InfiniBand adapter and the fibre channel adapter.

12. The method of claim 10, wherein processing received commands in the command path comprises protocol translation.

13. The method of claim 10, further comprising handling in a setup path configuration of a link between the fibre channel adapter and the InfiniBand channel adapter.

14. The method of claim 13, wherein configuration of the link comprises login.

15. The method of claim 13, wherein configuration of the link comprises logout.

16. The method of claim 13, wherein configuration of the link comprises logical unit identification.

17. The method of claim 10, wherein:
the command path is further operable to receive commands from the other of the InfiniBand and fibre channel adapters, to process the received commands, and to transmit the processed command to the first of the InfiniBand and fibre channel adapters; and
the data path is further operable to transfer data from the other of InfiniBand and fibre channel adapters to the first of the InfiniB and and fibre channel adapters.

18. The method of claim 10, further comprising SCSI commands carried over a first of InfiniBand and fibre channel to the other of InfiniBand and fibre channel.

19. A bridge, comprising:
an InfiniBand interface;
a fibre channel interface;
a fast path operable to transfer data between the InfiniBand interface and the fibre channel interface; and
a slow path operable to process and transfer commands between the Infiniband interface and the fibre channel interface wherein the fast path comprises a separate path bypassing the slow path such that the fast path is operable to transfer data between the InfiniBand channel adapter and the fibre channel adapter faster than the slow path.

20. The bridge of claim 19, further comprising a setup path operable to handle configuration of a link between the InfiniBand interface and the fibre channel interface.

21. The bridge of claim 20, wherein the setup path configuration comprises login.

22. The bridge of claim 20, wherein the setup path configuration comprises logout.

23. The bridge of claim 20, wherein the setup path configuration comprises logical unit identification.

24. The bridge of claim 19, wherein the fast path is operable to transfer SCSI data between the InfiniBand interface and the fibre channel interface.

25. The bridge of claim 19, wherein the slow path command processing comprises command routing.

26. The bridge of claim 19, wherein the fast path comprises a plurality of direct memory access channels and a memory.

27. A bridge, comprising:
processing means for processing commands received from a first of InfiniBand and fibre channel adapters;
transmitting means for transmitting the processed command to the other of the InfiniBand and fibre channel adapters; and
transfer means for transferring data in a data path from the first of the InfiniBand fibre channel adapters to the other of InfiniBand and fibre channel adapters wherein the transfer means comprise a separate path bypassing the processing means such that the transfer means is operable to transfer data between the InfiniBand channel adapter and the fibre channel adapter faster than the processing means.

* * * * *

UNITED STATES PATENT AND TRADEMARK OFFICE
CERTIFICATE OF CORRECTION

PATENT NO. : 7,571,272 B2  Page 1 of 1
APPLICATION NO. : 11/469369
DATED : August 4, 2009
INVENTOR(S) : Wilkinson et al.

It is certified that error appears in the above-identified patent and that said Letters Patent is hereby corrected as shown below:

In column 5, line 43, in Claim 10, delete "fibre" and insert -- and fibre --, therefor.

In column 6, line 13, in Claim 17, delete "InfiniB and" and insert -- InfiniBand --, therefor.

In column 6, line 52, in Claim 27, delete "fibre" and insert -- and fibre --, therefor.

Signed and Sealed this

Fifth Day of January, 2010

David J. Kappos
*Director of the United States Patent and Trademark Office*